TUNER FOR TELEVISION RECEIVERS
Filed June 13, 1951
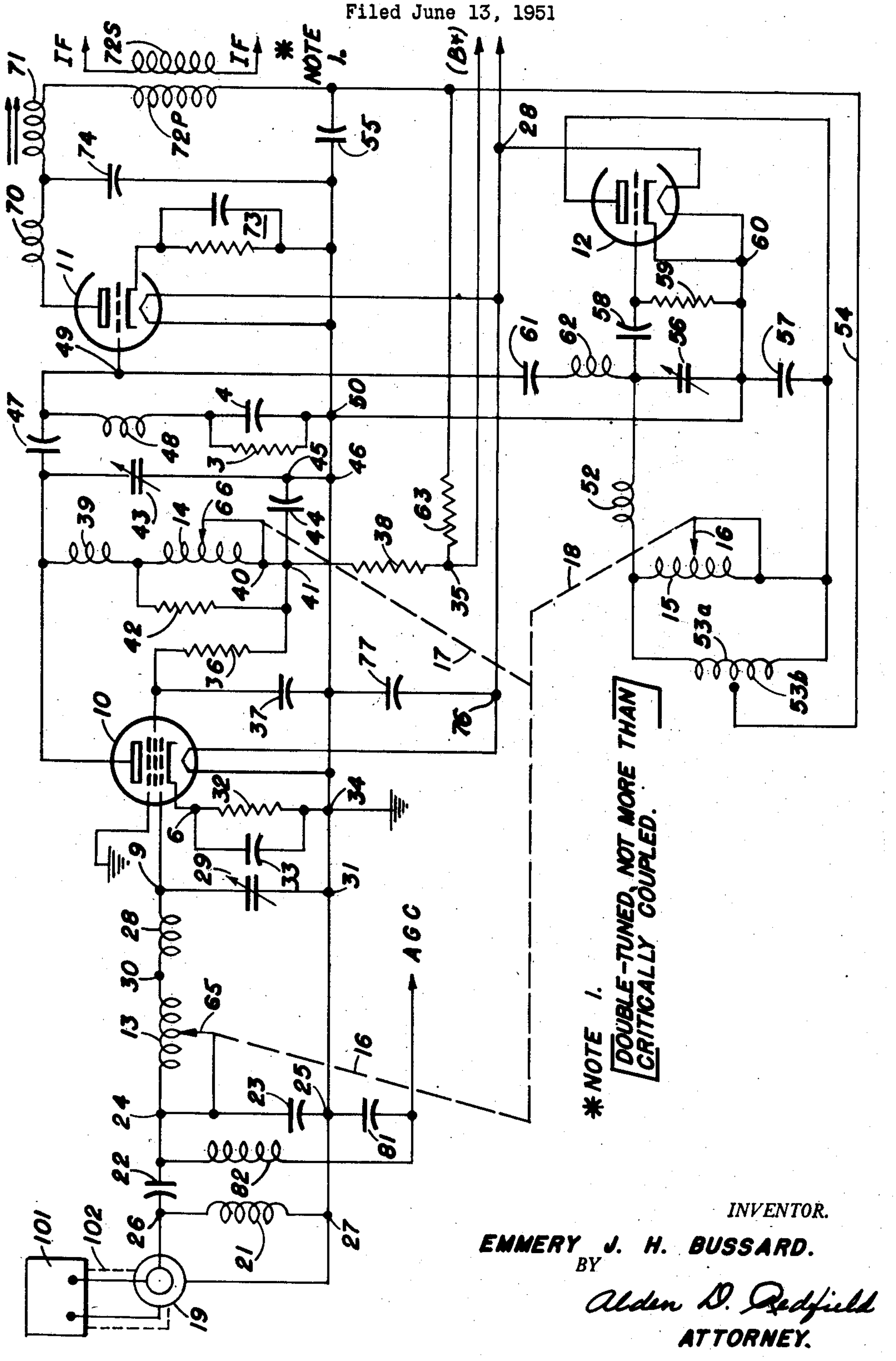
INVENTOR.
EMMERY J. H. BUSSARD.
BY
Alden D. Redfield
ATTORNEY.

United States Patent Office 2,711,477

Patented June 21, 1955

2,711,477

TUNER FOR TELEVISION RECEIVERS

Emmery J. H. Bussard, Cincinnati, Ohio, assignor to Avco Manufacturing Corporation, Cincinnati, Ohio, a corporation of Delaware Application June 13, 1951, Serial No. 231,401

2 Claims. (Cl. 250—20)

The present invention embraces an improved tuner which is of particular utility as embodied in a television receiver and is a continuation in part of application No. 160,316 filed May 5, 1950, now U. S. Patent No. 2,615,983, issued October 28, 1952. The tuner is, in customary parlance, referred to as "the front end" of a television receiver, and its peculiarly important contribution to over-all receiver performance requires satisfactory gain and signal-to-noise characteristics as well as adequate performance in all other respects. The tuner provided in accordance with the invention is of the continuous type, that is, it is continuously tunable by one manual operation through the lower standard television broadcast band beginning at 54 megacycles through all bands including the upper television broadcast band ending at 216 megacycles. The primary object of the present invention is to provide a tuner which satisfies the following requirements and aims:

(1) To provide a workable match between the radio frequency (R. F.) stage tube input impedance and the antenna transmission line impedance throughout the television broadcast range;

(2) To maintain this desirable match, while providing adequate rejection of undesired signals and spurious responses such as image frequencies;

(3) To enhance selectivity by tuning both input and output of the radio frequency amplifier stage;

(4) To minimize radiation of local oscillations;

(5) To minimize so-called white noise response.

For a better understanding of the present invention, together with other and further objects, advantages and capabilities thereof, reference is made to the following description of the accompanying drawing, in which there is shown a preferred illustrative tuner in accordance with the invention.

Referring now specifically to the drawing, it will be observed that the major tuner components are a radio frequency amplifier tube 10, a mixer or frequency-changing tube 11, a local oscillator tube 12 (elements 11, 12 being in the same envelope), and a three-circuit ganged inductor comprising variable inductances 13, 14 and 15, the inductors being ganged for unicontrol by any suitable mechanical expedients indicated by the dashed lines 16, 17 and 18.

The preselector or R. F. amplifier stage has a novel tuned antenna input circuit provided in accordance with the invention. In the specific example shown, this is coupled to an unbalanced line such as a 150 ohm twin lead cable through antenna terminal 19. This line works into and is coupled to a three-element reactive network 21, 22, 23 for matching the impedance of the line to the input impedance of the tuning circuit 13, 28, 29. This network is of the $\pi$-type and it comprises a shunt inductor arm 21, connected to the antenna terminal and between terminals 26, 27, a series capacitor arm 22 connected between terminals 26, 24, and a shunt capacitor arm 23 connected between terminals 24, 25. This network transforms the resistance load which is offered at the terminals 24, 25 looking toward tube 10, to the value of resistance, at terminals 26, 27, required to provide a satisfactory characteristic impedance load for the transmission line connected to antenna connector 19. The optimum match occurs at approximately the logarithmic means (115.6 megacycles) of the range extending from 54 to 216 megacycles.

In this manner, when the tuner is set for 115.6 megacycles, the impedance seen looking toward the input of tube 10 from terminals 24, 25, "looks like" a series circuit including lumped parameters of 1.9 ohms resistance and approximately 45 micromicrofarads capacitance. The network impedance seen looking toward the antenna from terminals 24, 25, is designed to match this equivalent series circuit to the characteristic impedance of the transmission line which couples the antenna to the terminal board 101. This match must be tolerable for characteristic impedances from 75 to 300 ohms in order to accommodate the various types of antenna systems in present use. It is to be noted that the shielded coupling link 102 which is connected between the antenna terminal board 101 and antenna tuner terminal 19 functions to impress a capacitive reactance approximately equal to 25 micromicrofarads across inductor 21 connected between terminals 26 and 27. This capacitance must be taken into consideration in calculations made to determine the correct parameters for the remainder of the input circuit.

Inductor 21 performs several useful functions in addition to its service as a parameter in the impedance transforming network 21, 22, 23. It functions as a high pass filter effectively shorting amplitude modulation (AM) broadcast signals to ground, such signals being those broadcast in the 540–1600 kilocycle band. The inductor 21 also serves as a direct current leakage path, and it prevents the undesired accumulation of static charges on the antenna.

The parameters of inductor 21 and capacitor 22 along with the abovementioned effective capacity of the shielded coupling link, as damped by the characteristic impedance of the antenna transmission line, are such that these elements are series resonant at approximately 25 megacycles, when a line having a 150 ohm characteristic impedance is used. Lines having a characteristic impedance between 75 and 300 ohms may be used in practice; however, the damping characteristic is modified accordingly. At 25 megacycles, then, there effectively would be a short circuit between terminals 24 and 27, and terminals 27 and 25 are placed so closely together that there would be in effect a short circuit between terminals 24 and 25, so that the input circuit of the radio frequency tube 10 would receive substantially no signal voltage at the frequency 25 megacycles or at frequencies near that value, such as the intermediate frequencies. The values of inductance 21 and capacitor 22 are so chosen as to provide further good intermediate frequency signal rejection.

In determining the values of capacitor 22 and inductor 21, I have endeavored so to choose them as to produce an effective short circuit between terminals 24 and 27 at some predetermined frequency. In pursuance of an established design principle, I have approximated that frequency at the arithmetical mean of the sound and video intermediate frequencies. Then I have made some compromises in favor of the use of commercially available components and in one successful embodiment of the invention so shaped the elements 21, 22 as to make them effectively resonant between approximately 17 and 32 megacycles. The effective attenuation band of 17 to 32 is the result of the damping effect of the transmission line impedance. Since at that frequency the elements 21, 22 in effect create a short circuit across terminals 24, 25, it will be seen that undesired signals of that frequency are highly attenuated. Now, then, as undesired signals of progressively lower frequencies are considered, capacitor 22 presents a progressively effective series impedance to them and inductor 21 presents a progressively effective shunting impedance so that at the broadcast range of 540 to 1600 kilocycles, the inductor 21 simply short circuits the undesired signals to ground. Throughout the frequency range from direct current up to 34 megacycles, the elements 21, 22 function as a good high pass filter.

In the illustrative embodiment shown, the parameters of inductor 21, capacitor 22 and capacitor 23 are so chosen as to be parallel resonant at 30 megacycles, a frequency value which is well below the 54 megacycle R. F. carrier frequency of the lowest television broadcast channel. Therefore, the parallel resonant circuit 21, 22, 23 is made to "look like" a capacitance to the tuned circuit 13, 28, 29 throughout the range of operating frequencies.

A primary aim in the tuned circuit comprising inductors 13 and 28 and capacitor 29 is to build up a large R. F. voltage across capacitor 29 in parallel with the input capacity of tube 10. Another primary consideration is to make the tuning of this circuit substantially dependent on the manual variation of inductor 13 only, and as independent as practicable of capacitance parameters. It will be appreciated that capacitor 29 is preset at the factory. It should be borne in mind that there is a return path for current flow in the selector circuit comprising the elements 13, 28 and 29, this return path existing between terminals 24 and 25 and comprising a number of branches, one of which consists of capacitor 23, another of which consists of the series combination of inductor 82 and capacitor 81, the third of which comprises the series combination of capacitor 22 and inductor 21, inductor 21 being paralleled by the antenna system. It is essential that this multi-branch return path between terminals 24 and 25 be capacitive throughout the tuning range, so that it will not introduce an inductance parameter into the tuned selector circuit. It is also essential that the capacitive reactance of this return path be low with respect to the capacitive reactance existing at the input of tube 10 and between terminals 9 and 31. The ratio of these reactances should be on the order of 3 to 1 as a minimum.

The functions of the series connected elements, capacitor 81 and inductor 82, are especially worthy of note. The primary function of these elements is to supply a circuit through which AGC signals may be fed back from the receiver circuit to control bias on the R. F. stage without impressing a serious load on the normal input circuit. Inductor 82 is selected to have a very low resistance parameter in order to reduce noise voltage input to the R. F. stage. The need for care in the selection of the parameters for this component arises because of the well known fact that a resistance component placed in series with the grid circuit of an amplifier produces a given amount of noise voltage due to the thermal effect (Johnson Noise). Reactive components do not contribute noise voltages. Unfortunately it is possible to show mathematically that any resistance placed between terminals 24 and 25 will have an equivalent circuit component in series with the control grid circuit of R. F. amplifier 10. Therefore it is necessary to keep parameters 81, 82 highly reactive, in other words, they should be of relatively high Q. In the majority of circuits this factor is not of prime importance, as it is here, because the signal being handled is usually large enough to more or less drown out the noise. In a tuner circuit, especially a television receiver tuner circuit, however, the magnitude of the input signal may be so low as to make noise voltages generated in this manner a very important factor to be considered. Thus in order to increase the tuner signal to noise ratio care must be taken to hold the resistance of inductor 82 to a minimum.

The combination of capacitor 81 and inductor 82 has a second important function and that is to act as an effective short circuit across terminals 24 and 25 to any low frequency signal which may be induced or impressed in that portion of the tuner circuit seen looking back from the input of tube 10 toward terminals 24 and 25. As has been explained, inductor 21 supplies an effective short to low frequency signals induced or impressed on the antenna input circuit, looking from the antenna circuit toward terminals 26, 27. However, inductor 21 can not act in this manner to low frequency signals which are induced in the circuit looking back from tube 10 toward terminals 24 and 25 because capacitance 22, as has been explained, must have a relatively low capacitance parameter. Thus this capacitor acts as a high impedance to low frequency signals. By placing inductor 82 and a high capacitance value capacitor 81 on the tube 10 input side of capacitor 22, a low impedance path is provided for effectively short circuiting these induced or impressed low frequency voltages. This has at least one important effect of reducing antenna radiation of voltages induced by the horizontal sweep circuit oscillator conventionally operating at around 15,750 cycles.

While resonant circuit 21, 22, 23 is made to "look like" a capacitance existing between terminals 24 and 25, so far as the tuned circuit 13, 28, 29 is concerned, it is also desirable to build up a high voltage across capacitor 23 in the desired tuning range and therefore the circuit 21, 22, 23 is made resonant at a frequency well below the lowest operating channel frequency of 54 megacycles. In one successful embodiment of the invention, I have chosen a value of approximately 28 megacycles as the resonant frequency of the circuit 21, 22, 23. It will be appreciated that if this circuti did not "look like" a capacitance to the selector circuit 13, 28, 29, it would introduce an undesired inductance parameter into the latter circuit which would limit the operating range and impair tracking among the two selector networks at the input and output of the tube 10 and the oscillator tank circuits.

This tuner provides a gain on the order of 6 db between the antenna terminals and the input terminals 9, 31, a particularly significant feature when it is considered that many commercially available tuners for television receivers show a loss between the corresponding points.

The input impedance of tube 10 considered alone, a type 6CB6 being chosen for this illustrative embodiment, varies from approximately 9,000 ohms, at the low or channel 1 end of the R. F. range, down to 500 ohms at the high or channel 13 end of the R. F. range, while the impedance locking toward the tube into terminals 24, 25 approximates 45 ohms at the mean of the range of R. F. frequencies.

While the effective impedance of tube 10, considered alone, varies between the wide limits mentioned, the input impedance between the control electrode of tube 10 and terminal 34 is maintained within relatively narrow limits on the order of 1500 ohms. In one successful embodiment of the invention, the variation was found to be between the limits of 1400 and 1650 ohms across the whole tuning range. This result is achieved by reason of a network 32, 33 which is provided between terminal 34 and the cathode of tube 10, as will be explained hereinafter. The circuitry provided in accordance with the present invention between terminals 24, 25 and the input of tube 10 is highly selective and at the same time provides adequate impedance transformation from 45 ohms to the input circuit impedance of tube 10. For these purposes I provide an L network composed of reactive elements as follows: A series combination of variable inductor 13, end inductor 28, and trimmer capacitor 29, effectively connected in series across terminals 24, 25. The capacitive element 29 is connected between one lead of coil 28 and terminal 31, terminal 31 being so close to terminal 25 as to be effectively at the same potential, and that lead of coil 28 also being connected to the control electrode of tube 10. The elements 13, 28, and 29 in combination with the tube input capacity comprise a series selector circuit which is manually varied to be resonant at the desired channel frequency and to tune the input of tube 10. This being a series resonant circuit, it affords the selectivity characteristic of such circuits and at the same time provides a very substantial gain approximating the product of the selector circuit Q and the input voltage across terminals 24, 25. It will be observed that the series resonant circuit 13, 28, 29 has a low impedance input approximating 45 ohms and a high impedance output (across capacitor 29) on the order of the tube input impedance between terminals 9, 31.

Referring now specifically to the radio frequency amplifying tube 10, a pentode is employed and its cathode is connected to grounded point 34 through a biasing resistor 32. The input circuit of tube 10 is so shaped as to accomplish the following objectives: (1) To minimize variations in input capacitance with transconductance, so that, looking into the tube at terminals 9, 31, there is presented a relatively stable input capacitance, thus precluding the introduction into the selector network of a widely varying frequency-determining capacitance parameter and again assuring that the selector network tuning is accomplished substantially by the variation of inductor 13 only; (2) to present a relatively constant high resistive load across terminals 9, 31, this load being sufficiently large to maintain an adequate response throughout the high frequency range under consideration.

A cathode resistor 32 is provided in part for the purpose of stabilizing the input capacitance of tube 10, and this resistor is connected between the cathode terminal and point 34. A value of 82 ohms is suitable for this resistor, although I do not desire to be limited to this specific illustrative value. As indicated at pages 15 and 16 of RCA Application Note AN–118, published April 15, 1947, by the Tube Department, Radio Corporation of America, Harrison, New Jersey, the undesired change in input capacitance with transconductance is reduced by the use of an unbypassed cathode resistor, such as element 32, in series with the cathode. In the absence of this resistor or with it heavily bypassed the pentode input capacitance would tend to vary with grid bias. This effect, known as the Miller effect, is of importance because it would tend to detune the selector circuit 13, 28, 29. Miller effect is minimized by incorporating a small amount of degenerative feedback, the latter being most easily accomplished by leaving the cathode resistance unbiased for R. F. The value of the resistor required depends upon the change of transconductance from cut-off to operating conditions, the grid-cathode transconductance of the tube, and the cold grid-to-cathode capacitance. To obtain full compensation for capacitance change, it can be demonstrated that it is necessary to make the product of cathode resistance and grid-cathode transconductance equal to the ratio of the increase in capacitance to the grid-cathode capacitance. The unbypassed cathode resistor reduces the effective transconductance and gain by an amount which increases with the value of the cathode resistor. An artificial increase in the amount of the cold grid-to-cathode capacitance permits the use of a smaller resistor value and lessens the loss of gain, leading to improved overall results. This purpose can be accomplished by connecting a small capacitor between the grid and cathode. In accordance with the invention, the last mentioned capacitance parameter is supplied by two capacitors in series, 33 and 29, the series combination being located in circuit between the control electrode and the cathode and therefore in parallel with the grid-cathode interelectrode capacitance. The use of too large a value of capacitance for this purpose would have an unfavorable effect on the input conductance of the tube.

Another effect of the use of the degenerative resistor 32, supplying current feedback, is to increase the input impedance offered by the tube to the applied signal voltage as seen looking into the terminals 9, 31, and to assist in maintaining that tube impedance sufficiently high to prevent undue damping of the tuned circuit.

It is not possible to divorce the discussion of the arrangements made to stabilize input capacitance and those made to stabilize input conductance, the two being so intimately related. At high frequencies the tube input conductance components due to transit time effects, tube lead inductance and feedback through the grid-plate capacitance from the plate circuit are effectively in parallel with the tuned grid circuit. The conductance components due to transit time effects and tube lead inductances are positive in sign and vary with the square of the frequency. The input conductance component due to feedback through the grid-plate capacitance, measured at the grid circuit resonant frequency, is negative in the particular illustrative embodiment shown, the plate load of tube 10 being so dimensioned as to incorporate an inductive component, the lead inductance between the anode of tube 10 and the inductor 39 and other distributed inductances being adequate to make the plate as a whole appear to have an inductive component. In the absence of special precautions, the input conductance of a pentode tends to vary rapidly over the television bands.

It having been indicated that it is not possible to segregate completely for purposes of discussion the effects of varying input capacitance and input conductance, and it having been pointed out how the feedback network 32, 33, and 29 is effective to stabilize input capacitance, the same network is likewise effective to stabilize input conductance and to maintain it low throughout the desired range.

One objective of my feedback network is to prevent incorporation in the selector network of excessive shunt capacitance, and therefore I make the series capacitor 29 sufficiently small to satisfy this requirement. At the same time it is desired to incorporate a frequency sensitive network such that the 180 degree component of feedback voltage will not remain in phase at frequencies where oscillations might occur due to increased input conductance, such conditions normally occurring and appearing as parasitic oscillations. Therefore, I incorporate in the feedback network and in series with the small capacitor 29 another capacitor 33 which is large in value by comparison with the value a neutralizing capacitor would have if it were directly connected between the cathode and grid of tube 10. At the same time, as indicated above, the capacitor 33 has reactance large by comparison with its shunting cathode resistor at normal operating frequencies, whereby resistor 32 is not R. F. bypassed at operating frequencies. A substantial economy is accomplished by making the cathode resistor 32 sufficiently large to function as a biasing resistor, thus permitting the omission of a bypassed resistor in series with it. It is recognized that, when resistor 32 is made sufficiently large to perform this additional function, it introduces more degenerative feedback than is optimum for purposes of stabilizing input conductance and capacitance. However, since the effect of an inductive plate load and the grid-plate feedback is such as to introduce regeneration, the plate circuit is so shaped as to compensate for the additional degeneration introduced when resistor 32 is made sufficiently large to function as the sode cathode resistor. Additional compensation is obtained by increasing the effective amount of cathode lead inductance by deliberately spacing point 6 from the socket cathode terminal.

The screen grid is connected to the positive terminal 35 of a suitable source of space current indicated by the symbol +B through a screen dropping resistor 36, bypassed by a capacitor 37, and plate resistor 38. The suppressor electrode is grounded. The anode circuit is connected to terminal 35 through a series combination of inductor 39, variable inductor 14 and resistor 38, terminal 40 of variable inductor 14 being connected to the junction 41 of resistors 36 and 38. A damping resistor 42 is connected in shunt with variable inductor 14. The selector circuit intercoupling amplifier tube 10 and mixer tube 11 is tuned to the desired operating frequency by adjustment of inductor 14, that inductor being a part of a parallel resonant circuit comprising an inductance branch consisting of inductors 39 and 14 and a capacitance branch consisting of adjustable capacitor 43, and capacitor 44, the effective plate to ground capacity of tube 10 and the effective grid-ground capacity of tube 11. Junction 45 of these two capacitors is connected to ground at 46 as shown. This tuned selector network 39, 14, 43, 44 in the anode circuit of tube 10 is coupled to the control electrode input circuit of a triode mixer tube 11 through a coupling capacitor 47. A network comprising capacitor 4, shunt resistor 3 and inductor 48 is connected between the control electrode terminal 49 of mixer tube 11 and ground 50. The functions of this network will now be described.

Primarily, the purpose of this network is to provide a low resistance D. C. path for discharging noise voltages impressed across coupling capacitor 47. In the past it has been the practice to supply an ordinary grid leak resistance at this point, however, it has been discovered that a considerable amount of so called "white noise" can be eliminated by using a low resistance grid leak impedance. It was found that high peak noise impulses, capable of driving mixer tube 11 into grid conduction, acted to charge up coupling capacitor 47 with a voltage of such polarity as to make the grid side of this capacitor negative with respect to its other plate. In circuits using a conventional grid leak resistor, this charge is retained for a relatively long period due to the long time constant resulting from the large R-C value of the coupling capacitor and grid leak resistor. Thus the noise effect, in these circuits, is prolonged as far as the remainder of the receiver circuit is concerned. By supplying a grid leak impedance comprising an inductor 48, resistor 3 and capacitor 4, I have established a relatively short time constant discharge path for coupling capacitor 47. Thus, even though noise voltages do succeed in charging up the capacitor, a very short time constant path allows coupling capacitor 47 to dissipate the noise charge voltages with such speed as to greatly diminish the "white noise" that would otherwise appear on the kinescope screen.

This network also has a very important, though secondary, function in that it acts as an I. F. trap. Before considering this function, it is important to note that the I. F. in a television receiver covers approximately a 4.5 megacycle frequency band, which in the particular illustrated embodiment, ranged from 21.9 megacycles to 26.4 megacycles. The importance of this will become clear when the function of network resistor 3 is considered. The trap action is realized by selecting parameters for inductor 48 and capacitor 4 which combine with the equivalent circuit looking back toward the plate of R. F. amplifier 10 to form a series tuned resonant circuit across terminals 49 and 50 at the I. F. frequencies. Of course this circuit across terminals 49, 50 has a high impedance at signal frequencies, acting effectively as or looking like a high inductance. Network resistor 3 serves two purposes. First, it supplies a D. C. path around capacitor 4 which is necessary for the grid leak discharge path of coupling capacitor 47, as explained above, and second, it reduces the "Q" of the series tuned circuit cross terminals 49 and 50 so that the trap action of the network functions across the complete I. F. bandwidth. The trap action of the network further acts to unload the grid circuit of the mixer tube at the I. F. freqencies, resulting in a more efficient mixing action in tube 11. In other words, if the network connected between terminals 49 and 50 had appreciable impedance at the I. F. frequencies, the I. F. voltage fed back through the grid plate capacitance of mixer tube 11 would supply an out of phase I. F. component to the input of mixer tube 11 tending to buck down the magnitude of the I. F. voltage otherwise present in the output of the mixer circuit. This degenerative feedback, at the I. F. frequencies is essentially eliminated by the trap, since the network is tuned to have a very low impedance at these frequencies. Effectively, the trap action of the network across terminals 49, 50 places the plate-grid capacitance of mixer tube 11 into its plate circuit so as to form a portion of the I. F. tank circuit capacitance.

Local oscillations are supplied to the control electrode input circuit of the frequency changing tube 11 by an oscillator including tube 12 and associated circuitry. This oscillator is described in detail in my copending patent application entitled "Tuner for Television Receiver," assigned to the same assignee as the present application and invention, Serial No. 154,535, filed in the U. S. Patent Office on April 7, 1950, which issued as Patent No. 2,579,789 on December 25, 1951. Reference is made to that patent for a detailed description of the oscillator. Briefly, however, this oscillator has a grid tank circuit comprising an inductor 52, an inductor 53A, and the distributed inductance of conductor 54, the terminus of the latter being R. F. grounded and effectively connected to the cathode of tube 12 by a capacitor 55. The capacitance of 55 is so large that it is not a substantial frequency-determining parameter in this tank circuit. The inductance branch comprising elements 52, 53A, and 54 is paralleled by an adjustable capacitor 56, R. F. connected between cathode and control electrode of oscillator triode 12.

The oscillator also has a plate tank circuit comprising inductor 53B and the distributed inductance of conductor 54, the inductance branch 53B, 54 being paralleled by a capacitor 57, connected between anode and cathode of tube 12. This oscillator is provided with the usual grid capacitor 58 and grid resistor 59, the latter being connected between the control electrode of tube 12 and the grounded point 60. Local oscillations are injected from the grid tank circuit of this oscillator into the control electrode circuit of the mixer triode 11 by a coupling network comprising a series combination of a capacitor 61 and an inductor 62, this series circuit being tuned to a resonant frequency considerably above the range of operating frequencies, for example about 270 megacycles. The frequency range of the local oscillations may extend from 80 to 240 megacycles, for example, while the range of received signal frequencies extends from 54 to 216 megacycles. I do not desire to be limited to any specific selection of frequencies, and have mentioned certain frequencies and dimensions herein for purposes of illustration only and not of limitation. The advantage of the coupling network 61, 62 is that the coupling between the oscillator and the frequency-changing tube 11 tends to become more resistive and less reactive as the receiver is attuned to higher operating frequencies, thereby compensating for the natural tendency of the output of the oscillator to decrease in intensity.

The distributed inductance of conductor 54 is common to both plate and grid tank circuits, so that a portion of the voltage fed back from the plate circuit to the grid circuit is applied to the grid circuit through this common inductance. The capacitors 56 and 57 function as a voltage divider network between input and output circuits, the voltages for their respective terminals remote from one another being approximately 180 degrees out of phase, so that feedback also results from this voltage division. This oscillator possesses a high degree of stability throughout its range of operation, for the reason among others that both oscillator tank circuits are tuned in unison. Tuning is accomplished by adjustment of variable inductor 15, the latter being connected across inductors 53A and 53B. The D. C. path for anode voltage may be traced from terminal 35 through resistor 63, conductor 54 and inductor 53B to the anode of tube 12. Inductor 52 is magnetically isolated and shielded from inductor 53A, and there is essentially no magnetic coupling therebetween.

Each of the grid and plate tank circuits, considered alone, is tuned below the operating frequency so as to appear capacitive at each operating frequency. As stated, the oscillator is adjusted as to frequency by manual adjustment of inductor 15, it being ganged with inductors 13 and 14.

It will be understood that the tuning elements comprising inductors 13, 14, and 15 and their adjustable contacts 65, 66, and 16, respectively, are included in a three-gang spiral continuously variable ganged inductor which may be of the general type shown in Fig. 167, page 151, of the Photofact Television Course, March 1949, Howard W. Sams & Company, Inc., Indianapolis 7, Indiana. Such an inductor is also shown in Fig. 19–3, page 379, Basic Television Principles and Servicing, Grob, McGraw-Hill Book Co., New York, 1949, first edition. In this tuner a sliding contactor "shorts" the unused portion of the inductance. Since ganged inductors are per se well known, the elements need not be shown in detail.

The mixer tube 11 and oscillator tube 12 may be comprised of different sections of a type 12AT7 or type 12AV7 tube, for example. It will, of course, be understood that separate tubes in separate envelopes may alternatively be used. The mixer tube 11 has a cathode connected to ground through the resistance-capacitance or self-biasing network 733. Parameters of the network 73 are selected to bias the grid of the mixer tube along its characteristic curve so that the oscillator injection voltage does not swing the grid into the grid current region. This insures a relatively high conversion conductance without grid circuit loading brought about by grid current flow. As a result, it has been found possible to reduce the power output required of the oscillator circuit from that which would have been required without a self-biasing cathode impedance connected into the mixer tube circuit. Thus, oscillator radiation becomes less of a problem and a simple shield structure is sufficient to limit radiation to practical values. The mixer tube has a plate load consisting of a series combination of inductor 70, iron core adjustable inductor 71, and output transformer primary $72_p$, the anode circuit being completed for high frequency signals by a capacitor 55. Between ground and the junction of inductors 70, 71 is connected a capacitor 74.

As indicated in RCA Application Note AN–138, published March 15, 1949, by the Tube Department, Radio Corporation of America, Harrison, New Jersey, it is important that the plate circuit be inductive to the tuned R. F. frequencies. The mixer circuit including tube 11 is so arranged as to prevent two undesired contingencies: (1) oscillations at R. F. or I. F.; (2) undesired damping of the input circuit at R. F. To this end capacitor 74 is connected between the junction of coils 70, 71 and ground, coil 70 and capacitor 74 together forming a series resonant circuit which resonates slightly above the maximum operating frequency (216 megacycles). This circuit 70, 74 "looks like" a very low impedance at resonance to R. F. and therefore unloads the plate circuit at R. F. and prevents a high impedance from being built up across the plate circuit at R. F., thereby tending to prevent oscillations. On the other hand, the inductance of coil 70 is too small to present any substantial impedance to I. F., and the capacitor 74 has a very high impedance at I. F. frequencies, being effectively part of the parallel resonant I. F. primary circuit.

The plate circuit parameters of tube 11 are selected to provide positive or regenerative feedback conditions at R. F. so as to (1) reduce tube loading, resulting in higher Q and circuit gain, and (2) to improve the signal to noise ratio. The parameters are also so chosen so that the circuit is prevented from regenerative oscillation over the desired range. As has been stated this input has a high impedance at R. F. frequencies and a very low impedance at I. F. frequencies.

It has been indicated that for I. F. a high impedance exists across capacitor 74. This impedance is transformed into a relatively low coupling impedance output by the L-type network comprising winding 71 and transformer primary $72_p$, the coupling impedance being on the order of 100 ohms. The use of an inductively coupled output circuit, transformer 72, makes it possible to design the grid circuit of the first I. F. stage, not shown, so as to be essentially free of capacitance and resistance combinations. This means that it is possible to reduce the R-C time constant of the I. F. input circuit to an absolute minimum thereby effectively eliminating a white noise contributing factor much in the same manner as is discussed with respect to coupling capacitor 47.

One filament lead of tube 10 is connected to ground, and another to the ungrounded filament supply terminal 76, either direct or alternating current being suitable for this supply, heater bypass capacitor 77 being provided for the heater of tube 10. The filament connections for the tubes 11 and 12 are similar to the filament connections used for tube 10, but no additional bypass capacitors are normally required.

Oscillator radiation is particularly low with this tuner, because the combination of inductors 13 and 28 along with normal low plate to grid capacitance of R. F. amplifier 10 presents a very high impedance to oscillator frequencies, while capacitor 23 affords a very low shunting impedance to those frequencies, so that they are highly attenuated. Also, as has been explained, the self-biasing action of the mixer circuit allows the oscillator to operate at a relatively lower power output level.

One of the advantages of this tuner circuit is that the selector network 13, 28, 29 produces a very substantial gain between antenna and R. F. stage input when tuned to resonance, provides good selectivity for desired signals and high rejection of undesired signals, and enhances the signal to noise ratio.

Since both input and output circuits of the radio frequency amplifier stage 10 are tuned to the desired channel, the tuner has very good selectivity characteristics. Also, the fact that these resonant circuits are single tuned, i. e., they do not have a resonant characteristic of the multiple peak type but instead have a resonant characteristic curve which peaks at only one frequency for each tuner setting, makes alignment of the unit possible with only a signal generator and a voltmeter. This is to be compared with prior art circuits having over-critically-coupled tuned circuits, or multiple peak resonant characteristic tuned circuits. In order to align circuits of the overcritically-coupled type it is necessary to use a sweep generator and an oscilloscope with a minimum of two marker frequencies. Single tuned resonant circuits lend themselves to mass production operations from the production tolerance viewpoint. Quite to the contrary, regardless of the amount of equipment used, it is almost impossible to maintain consistent production tolerances with a tuner requiring alignment of multiple peak characteristic type of resonant circuits. The gain characteristics are enhanced by the effective voltage amplification occurring in the first selector network 13, 28, 29, and by the second selector network 39, 14, 44, 43.

The pass-band characteristics of both selector networks, i. e., the two R. F. tuned networks, are adequate to assure satisfactory fidelity and they can be broadly defined as having single peaked resonant response characteristics. In other words, these two networks pass frequencies over the entire desired receiver pass-band at the 3 db point on their characteristic resonance curves. The primary and secondary circuits of output transformer 72, however, are both tuned in such a manner as to provide an undercritically-coupled double-tuned circuit having a relatively narrow 3 db pass-band with accompanying sharp skirt attenuation. Here again I have supplied a tuned circuit having a single peak resonant response characteristic, however, the Q is much higher in this network than it is in the case of the previously mentioned selector networks. In other words, the complete tuner, including the coupling circuit between the mixer stage output and the first I. F. stage input, passes frequencies over the entire desired receiver band; however, not all of these frequencies are passed at the 3 db point on the output characteristic curve, because the pass-band of the output transformer coupling circuit is relatively narrow. Then in order to amplify the complete desired bandwidth, the tuner must be used with an I. F. amplifier or I. F. amplifying stages "tailored" to pass the remainder of the desired pass-band at the over-all or tuner-I. F. 3 db point. Of course double tuned I. F. stages could be employed, so long as the over-all system, i. e., tuner and I. F. circuits, is defined with the correct Q characteristics. In other words, a "tailored" I. F. system can be defined as two or more single or multiple tuned stages having the correct Q to add as a product, so as to provide the desired over-all pass-band characteristic when operated with its tuner as a composite unit. In the specific embodiment shown a staggered-tuned I. F. amplifier was used. The pass-band characteristics of both selector networks are adequate to assure satisfactory fidelity with a tailored I. F. system, e. g., a staggered-tuned I. F. system wherein the tuner acts as one component in the complete staggered-tuned combination. In other words, in the specific embodiment shown and described, the tuner passes frequencies over the entire desired receiver pass-band; however, not all of these frequencies are passed at the 3 db point on the characteristic curve. In fact, the band of frequencies passed by the tuner at the 3 db point is relatively narrow just as the pass-band of the first stage in a staggered-tuned amplifier is relatively narrow at the 3 db point. Then in order to amplify the complete desired bandwidth, the I. F. amplifiers are "tailored" to pass a portion of the desired bandwidth at the over-all, i. e., tuner-I. F., 3 db point, while the tuner passes the remainder of the band at the over-all 3 db point.

Inductor 21 and inductor 82 in conjunction with capacitor 81 bypass signals of intermediate frequency to ground. Heterodyne detection of two signals having a frequency difference lying within the tuning range of the receiver, and resultant cross talk, are suppressed by the tuned input circuit 13, 28, 29 between the grid of the R. F. tube 10 and the antenna, that circuit preventing the undesired one of the interfering signals from reaching the grid of tube 10. The trap network connected across mixer input terminals 49, 50 allows the coupling capacitor 47 to discharge rapidly thereby eliminating the possibility of "white noise" voltages being retained across this coupling capacitor. The trap also acts to keep I. F. frequencies off of the mixer grid circuit and effectively connects the plate to grid capacitance of the mixer tube into the I. F. tank circuit as a part of the tank circuit capacitance. The self-biasing network in the mixer tube cathode circuit serves to provide a more efficient mixer system especially in regard to oscillator drive voltage, thereby allowing the heterodyning oscillator to be operated at a relatively low power output thus holding undesired radiation to a practical minimum. The transformer coupling provided at the output of the mixer stage allows the use of a low time constant I. F. amplifier input circuit, thereby minimizing "white noise" effects in this part of the receiver circuit.

Image response is reduced because the two selector networks suppress image frequency signals before application to the input of the mixer tube 11. Shielding prevents coupling of undesired strays, including intermediate frequency harmonics produced by the second detector, into the radio frequency input circuits. It will be observed that the shunt input capacitance of tube 10, in parallel with capacitor 29, is one of the frequency determining parameters of the tunable selector network comprising elements 13, 28, and 29. Further, the output capacitance of tube 10 and the input capacitance of tube 11 are effectively in shunt with capacitor 43 and are frequency determining parameters in the tunable selector circuit including the elements 39, 14, 43, and 44.

While I do not desire to be limited to any specific circuit parameters, the latter varying widely in accordance with specific design requirements, the following have been found to be entirely satisfactory in one successful embodiment of the present invention:

| | |
|---|---|
| Tube **10** | Type 6CB6 |
| Tube **11** and **12** | Sections of tube type 12AT7 or tube type 12AV7. |
| Resistor **3** | 4700 ohms. |
| Resistor **32** | 82 ohms. |
| Resistor **36** | 15,000 ohms. |
| Resistor **38** | 560 ohms. |
| Resistor **42** | 5600 ohms. |
| Resistor **59** | 15,000 ohms. |
| Resistor **63** | 5600 ohms. |
| Capacitor **4** | 3.3 micromicrofarads. |
| Capacitor **22** | 27 micromicrofarads. |
| Capacitor **23** | 27 micromicrofarads. |
| Capacitor **29** | 0.8 to 5.5 micromicrofarads, adjustable. |
| Capacitor **33** | 4.7 micromicrofarads. |
| Capacitor **37** | 1500 micromicrofarads. |
| Capacitor **43** | 0.8 to 5.5 micromicrofarads, adjustable. |
| Capacitor **44** | 5000 micromicrofarads. |
| Capacitor **47** | 6 micromicrofarads. |
| Capacitor **55** | 1500 micromicrofarads. |
| Capacitor **56** | 0.8 to 5.5 micromicrofarads, adjustable. |
| Capacitor **57** | 6 micromicrofarads. |
| Capacitor **58** | 6 micromicrofarads. |
| Capacitor **61** | 1 micromicrofarad. |
| Capacitor **74** | 10 micromicrofarads. |
| Capacitor **77** | 1500 micromicrofarads. |
| Capacitor **81** | 1500 micromicrofarads. |
| Self-bias network **73** | 1200 ohms resistance, 1500 micromicrofarads. |
| Inductors **13, 14, 15** | .025 to .715 microhenry, approximately. |
| Inductor **21** | .82 microhenry, approximately. |
| Inductor **28** | .030 microhenry, approximately. |
| Inductor **39** | .025 microhenry, approximately. |
| Inductor **52** | .032 microhenry, approximately. |
| Inductor **53A** | .375 microhenry, approximately. |
| Inductor **53B** | .375 microhenry, approximately. |
| Distributed inductance of conductor **54** | .01 microhenry, approximately. |
| Inductor **62** | .22 microhenry, approximately. |
| Inductor **70** | .035 microhenry, approximately. |
| Inductor **71** | 2.7 microhenries, approximately. |
| Inductor **82** | 8.2 microhenries, approximately. |

53A and 53B are wound as a continuous solenoid (approximately 1.45 microhenries total).

The characteristics of a type 6CB6 tube are fully described and tabulated in Application Note AN-143, published March 31, 1950, by the Tube Department, Radio Corporation of America, Harrison, New Jersey.

Thus, it will be seen that I have provided, in a continuously adjustable tuner for a television receiver the combination comprising an R. F. stage 10 having variable inductor single-tuned circuits in the input 13, 28, 29 and the output 14, 39, 43, 44 with a given 3 db pass-band characteristic of at least 3.5 megacycles over the desired tuning range, a lumped inductor-capacitor network 81, 82 coupled between a source of AGC signals and the R. F. stage input tuned circuit 13, 28, 29, the parameters for said network being selected to attenuate frequencies substantially at I. F. and below, a mixer stage 11 having an input and an output circuit, said mixer stage input being coupled to the output of said R. F. stage through a network including series resonant I. F. trap (3, 4, 48, in conjunction with the impedance looking toward the output of tube 10) connected directly in parallel with the mixer stage input, a coupling capacitor 47 included in the network coupling the R. F. stage to the mixer stage, said resonant trap parameters being tuned to establish substantially a short circuit over the I. F. frequency band and provide a discharge path for said coupling capacitor 47 such that coupling capacitor noise voltage charge is dissipated substantially instantaneously, a double-tuned inductively coupled circuit (the tuned circuits in the primary and secondary of transformer 72), not more than critically coupled, having a narrower 3 db pass-band than said given pass-band for coupling the output of the mixer stage to the first stage of a staggered-tuned amplifier.

While there has been shown and described what is at present considered to be the preferred embodiment of the invention, it will be obvious to those skilled in the art that various modifications and substitutions of equivalents may be made therein without departing from the true spirit of the invention and the scope of the claims appended thereto I claim:

1. In a television receiver tuner of the continuously adjustable type, the combination comprising a radio frequency stage having a variable inductor fixed capacitor single-tuned preselector circuit in the input and a separate variable inductor fixed capacitor single-tuned preselector circuit in the output, a series resonant intermediate frequency trap circuit connected across the radio frequency stage output single-tuned preselector circuit for providing a low resistance capacitor discharge path and for attenuating frequencies substantially at the intermediate frequency and below, an attenuator circuit coupled to the single-tuned circuit in the input of the radio frequency stage for attenuating frequencies substantially at the intermediate frequencies and below, a source of automatic gain control signals coupled to said radio frequency input stage through said attenuator, and a self-biased mixer circuit having an input circuit and an output circuit, the input circuit of said mixer being connected directly across and in parallel with the radio frequency stage output intermediate frequency trap.

2. In a continuously adjustable tuner for a television receiver, the combination comprising a radio frequency stage having a variable inductor single-tuned circuit in the input and a varible inductor single-tuned circuit in the output, said stage having a 3 db pass-band characteristic of at least 3.5 megacycles over the desired tuning range, a lumped inductor-capacitor network coupled across the radio frequency stage input tuned circuit, the parameters for said network being selected to attenuate frequencies substantially at the intermediate frequency and below, a source of automatic gain control signals coupled to said radio frequency stage through said network, a mixer stage having an input and an output circuit, said mixer stage input being coupled to the output of said radio frequency stage through a network including a series resonant intermediate frequency trap connected directly in parallel with the mixer stage input and a coupling capacitor connected in series with the mixer stage input, said resonant trap parameters being tuned to establish substantially a short circuit over the intermediate frequency band and provide a discharge path for said coupling capacitor such that coupling capacitor noise voltage charge is dissipated substantially instantaneously, a double-tuned inductively coupled circuit, not more than critically coupled, having a narrower 3 db pass-band than said given pass-band for coupling the output of the mixer stage to the first intermediate frequency stage of a staggered-tuned amplifier.

References Cited in the file of this patent

UNITED STATES PATENTS

| | | |
|---|---|---|
| 1,738,274 | Anderson | Dec. 3, 1929 |
| 1,978,446 | Aubert | Oct. 30, 1934 |
| 2,062,956 | Albright | Dec. 1, 1936 |
| 2,101,670 | Byk et al. | Dec. 7, 1937 |
| 2,102,401 | Yolles | Dec. 14, 1937 |
| 2,115,676 | Wheeler | Apr. 26, 1938 |
| 2,226,488 | Clay | Dec. 24, 1940 |
| 2,278,030 | Weber | Mar. 31, 1942 |
| 2,303,388 | Pray | Dec. 1, 1942 |
| 2,402,606 | Davis | June 25, 1946 |
| 2,422,381 | White | June 17, 1947 |